United States Patent
Agombar et al.

(10) Patent No.: US 8,688,936 B2
(45) Date of Patent: *Apr. 1, 2014

(54) POINT-IN-TIME COPIES IN A CASCADE USING MAPS AND FDISKS

(75) Inventors: John P. Agombar, Hampshire (GB); Christopher B. Beeken, Hampshire (GB); Carlos F. Fuente, Hampshire (GB); William J. Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/125,276

(22) PCT Filed: Oct. 20, 2009

(86) PCT No.: PCT/EP2009/063755
§ 371 (c)(1),
(2), (4) Date: Apr. 20, 2011

(87) PCT Pub. No.: WO2010/049314
PCT Pub. Date: May 6, 2010

(65) Prior Publication Data
US 2011/0208932 A1    Aug. 25, 2011

(30) Foreign Application Priority Data
Oct. 30, 2008    (EP) ..................................... 08167951

(51) Int. Cl.
*G06F 12/00*    (2006.01)
(52) U.S. Cl.
USPC ....................................................... 711/162

(58) Field of Classification Search
USPC ........... 711/161, 162, E12.103; 707/640–660
See application file for complete search history.

(56) References Cited

U.S. PATENT DOCUMENTS 5,210,866 A    5/1993    Milligan et al.
5,347,653 A *  9/1994    Flynn et al. ................... 707/695
(Continued)

FOREIGN PATENT DOCUMENTS

CA    2 593 289    8/2006
CN    1702627    11/2005
(Continued)

OTHER PUBLICATIONS

Compaq White Paper, Enterprise Volume Manager and Oracle8 Best Practices, Dec. 1999, attached as EVMWhitePaper1999.pdf.*
(Continued)

*Primary Examiner* — Matthew Bradley
(74) *Attorney, Agent, or Firm* — Konrad Raynes Davda & Victor LLP

(57) ABSTRACT

A technique for handling a FlashCopy® process includes receiving a FlashCopy® instruction for a source disk, performing a FlashCopy® point in time copy of the source disk on to a target disk, creating a map specifying the FlashCopy® point in time copy from the source disk to the target disk, creating a primary fdisk for the source disk, if one does not already exist, and creating a primary fdisk for the target disk, if one does not already exist, or, if one does already exist, converting the existing primary fdisk for the target disk into a secondary fdisk, and creating a new primary fdisk for the target disk.

14 Claims, 5 Drawing Sheets

(56) References Cited

U.S. PATENT DOCUMENTS

| | | | |
|---|---|---|---|
| 5,369,757 A * | 11/1994 | Spiro et al. | 714/19 |
| 5,403,639 A * | 4/1995 | Belsan et al. | 1/1 |
| 5,649,152 A * | 7/1997 | Ohran et al. | 711/114 |
| 5,664,186 A * | 9/1997 | Bennett et al. | 1/1 |
| 5,956,713 A * | 9/1999 | Bamford et al. | 1/1 |
| 6,023,744 A * | 2/2000 | Shoroff et al. | 711/4 |
| 6,038,639 A * | 3/2000 | O'Brien et al. | 711/114 |
| 6,141,773 A * | 10/2000 | St. Pierre et al. | 714/20 |
| 6,202,085 B1 | 3/2001 | Benson et al. | |
| 6,269,381 B1 * | 7/2001 | St. Pierre et al. | 1/1 |
| 6,269,431 B1 * | 7/2001 | Dunham | 711/162 |
| 6,341,341 B1 * | 1/2002 | Grummon et al. | 711/162 |
| 6,353,878 B1 * | 3/2002 | Dunham | 711/162 |
| 6,366,986 B1 * | 4/2002 | St. Pierre et al. | 711/162 |
| 6,434,681 B1 * | 8/2002 | Armangau | 711/162 |
| 6,594,744 B1 | 7/2003 | Humlicek et al. | |
| 6,611,901 B1 * | 8/2003 | Micka et al. | 711/162 |
| 6,651,075 B1 * | 11/2003 | Kusters et al. | 1/1 |
| 6,792,518 B2 * | 9/2004 | Armangau et al. | 711/162 |
| 6,934,822 B2 * | 8/2005 | Armangau et al. | 711/162 |
| 6,948,089 B2 * | 9/2005 | Fujibayashi | 714/6.3 |
| 6,959,310 B2 * | 10/2005 | Eshel et al. | 1/1 |
| 7,032,091 B2 * | 4/2006 | Ueno | 711/162 |
| 7,089,386 B2 * | 8/2006 | Suzuki et al. | 711/162 |
| 7,093,087 B2 * | 8/2006 | Suzuki et al. | 711/161 |
| 7,100,089 B1 * | 8/2006 | Phelps | 714/42 |
| 7,103,713 B2 * | 9/2006 | Saika et al. | 711/112 |
| 7,111,014 B2 * | 9/2006 | Sawdon et al. | 1/1 |
| 7,120,827 B2 * | 10/2006 | Fujibayashi | 714/6.32 |
| 7,136,977 B2 * | 11/2006 | Obayashi et al. | 711/162 |
| 7,165,141 B2 * | 1/2007 | Cochran et al. | 711/114 |
| 7,181,477 B2 * | 2/2007 | Saika et al. | 1/1 |
| 7,188,272 B2 * | 3/2007 | Bartfai et al. | 714/6.31 |
| 7,197,519 B2 * | 3/2007 | Nishikawa et al. | 1/1 |
| 7,203,732 B2 * | 4/2007 | McCabe et al. | 709/217 |
| 7,231,544 B2 * | 6/2007 | Tan et al. | 714/15 |
| 7,239,581 B2 * | 7/2007 | Delgado et al. | 368/10 |
| 7,243,116 B2 * | 7/2007 | Suzuki et al. | 707/640 |
| 7,251,713 B1 * | 7/2007 | Zhang | 711/162 |
| 7,257,689 B1 * | 8/2007 | Baird | 711/162 |
| 7,257,690 B1 * | 8/2007 | Baird | 711/162 |
| 7,266,654 B2 * | 9/2007 | Nakano et al. | 711/162 |
| 7,272,666 B2 * | 9/2007 | Rowan et al. | 710/5 |
| 7,272,693 B2 * | 9/2007 | Ushijima et al. | 711/162 |
| 7,284,016 B2 * | 10/2007 | Venkatesh et al. | 1/1 |
| 7,287,045 B2 * | 10/2007 | Saika et al. | 1/1 |
| 7,287,133 B2 * | 10/2007 | Rowan et al. | 711/156 |
| 7,293,145 B1 * | 11/2007 | Baird et al. | 711/162 |
| 7,296,008 B2 * | 11/2007 | Passerini et al. | 1/1 |
| 7,360,048 B2 * | 4/2008 | Agombar et al. | 711/162 |
| 7,370,235 B1 * | 5/2008 | Gulve et al. | 714/20 |
| 7,386,695 B2 * | 6/2008 | Fuente | 711/162 |
| 7,398,366 B2 * | 7/2008 | Ohran et al. | 711/162 |
| 7,433,948 B2 * | 10/2008 | Edsall et al. | 709/224 |
| 7,437,603 B2 * | 10/2008 | Ebata et al. | 714/6.1 |
| 7,461,100 B2 * | 12/2008 | Spear et al. | 1/1 |
| 7,509,523 B2 * | 3/2009 | Agombar et al. | 714/5.11 |
| 7,546,428 B1 | 6/2009 | McAndrews et al. | |
| 7,567,991 B2 * | 7/2009 | Armangau et al. | 1/1 |
| 7,603,529 B1 * | 10/2009 | MacHardy et al. | 711/162 |
| 7,610,318 B2 * | 10/2009 | Bartfai et al. | 1/1 |
| 7,676,641 B2 * | 3/2010 | Agombar et al. | 711/162 |
| 7,725,436 B1 | 5/2010 | Park | |
| 7,793,144 B2 * | 9/2010 | Agombar et al. | 714/5.11 |
| 7,966,293 B1 * | 6/2011 | Owara et al. | 707/654 |
| 8,122,286 B1 * | 2/2012 | Eng et al. | 711/161 |
| 8,195,906 B2 * | 6/2012 | Agombar et al. | 711/165 |
| 8,209,680 B2 * | 6/2012 | Le et al. | 717/174 |
| 2001/0044807 A1 * | 11/2001 | Kleiman et al. | 707/203 |
| 2003/0177321 A1 * | 9/2003 | Watanabe | 711/161 |
| 2003/0191916 A1 * | 10/2003 | McBrearty et al. | 711/162 |
| 2004/0117572 A1 * | 6/2004 | Welsh et al. | 711/162 |
| 2004/0250033 A1 * | 12/2004 | Prahlad et al. | 711/162 |
| 2005/0160243 A1 * | 7/2005 | Lubbers et al. | 711/162 |
| 2005/0172092 A1 * | 8/2005 | Lam et al. | 711/161 |
| 2005/0182910 A1 * | 8/2005 | Stager et al. | 711/162 |
| 2005/0210193 A1 * | 9/2005 | Nagata | 711/114 |
| 2005/0210209 A1 * | 9/2005 | Nagata | 711/162 |
| 2005/0216535 A1 * | 9/2005 | Saika et al. | 707/204 |
| 2005/0228945 A1 * | 10/2005 | Nagata | 711/114 |
| 2005/0278391 A1 * | 12/2005 | Spear et al. | 707/201 |
| 2006/0107006 A1 * | 5/2006 | Green et al. | 711/162 |
| 2006/0112244 A1 | 5/2006 | Buah et al. | |
| 2006/0129774 A1 * | 6/2006 | Tabuchi et al. | 711/162 |
| 2006/0139697 A1 | 6/2006 | Fuente | |
| 2006/0143413 A1 * | 6/2006 | Agombar et al. | 711/162 |
| 2006/0155946 A1 * | 7/2006 | Ji | 711/162 |
| 2006/0174074 A1 | 8/2006 | Banikazemi et al. | |
| 2006/0179061 A1 | 8/2006 | D'Souza et al. | |
| 2006/0218364 A1 * | 9/2006 | Kitamura | 711/162 |
| 2006/0259725 A1 * | 11/2006 | Saika et al. | 711/162 |
| 2007/0005886 A1 * | 1/2007 | Nagata | 711/114 |
| 2007/0005914 A1 * | 1/2007 | Thompson et al. | 711/162 |
| 2007/0005915 A1 * | 1/2007 | Thompson et al. | 711/162 |
| 2007/0022264 A1 * | 1/2007 | Bromling et al. | 711/162 |
| 2007/0038822 A1 * | 2/2007 | Correl | 711/162 |
| 2007/0061531 A1 | 3/2007 | Bartfai et al. | |
| 2007/0067583 A1 * | 3/2007 | Zohar et al. | 711/162 |
| 2007/0079089 A1 * | 4/2007 | Ohran et al. | 711/162 |
| 2007/0094464 A1 * | 4/2007 | Sharma et al. | 711/162 |
| 2007/0094465 A1 * | 4/2007 | Sharma et al. | 711/162 |
| 2007/0094466 A1 * | 4/2007 | Sharma et al. | 711/162 |
| 2007/0185973 A1 * | 8/2007 | Wayda et al. | 709/217 |
| 2007/0245103 A1 * | 10/2007 | Lam et al. | 711/161 |
| 2007/0250663 A1 * | 10/2007 | Welsh et al. | 711/117 |
| 2007/0294493 A1 | 12/2007 | Buah et al. | |
| 2008/0028171 A1 * | 1/2008 | Uratani et al. | 711/162 |
| 2008/0034178 A1 * | 2/2008 | Nagata | 711/162 |
| 2008/0114951 A1 | 5/2008 | Lee | |
| 2008/0126442 A1 * | 5/2008 | Cisler et al. | 707/204 |
| 2008/0144471 A1 * | 6/2008 | Garapati et al. | 369/99 |
| 2008/0183988 A1 * | 7/2008 | Qi | 711/162 |
| 2008/0215837 A1 * | 9/2008 | Agombar et al. | 711/162 |
| 2008/0222376 A1 * | 9/2008 | Burton et al. | 711/162 |
| 2008/0235266 A1 | 9/2008 | Huang et al. | |
| 2008/0320218 A1 * | 12/2008 | Nagata | 711/114 |
| 2009/0228651 A1 * | 9/2009 | Sharma et al. | 711/114 |
| 2009/0259816 A1 * | 10/2009 | Sharma et al. | 711/162 |
| 2009/0259817 A1 * | 10/2009 | Sharma et al. | 711/162 |
| 2009/0276593 A1 * | 11/2009 | Jacobson et al. | 711/162 |
| 2009/0282101 A1 * | 11/2009 | Lim et al. | 709/203 |
| 2009/0319735 A1 * | 12/2009 | Agombar et al. | 711/162 |
| 2010/0023561 A1 | 1/2010 | Zlotnick | |
| 2010/0077160 A1 | 3/2010 | Liu et al. | |
| 2010/0088468 A1 | 4/2010 | Agombar et al. | |
| 2012/0246427 A1 | 9/2012 | Agombar et al. | |
| 2013/0086343 A1 | 4/2013 | Beeken et al. | |

FOREIGN PATENT DOCUMENTS

| | | |
|---|---|---|
| CN | 1794199 | 6/2006 |
| CN | 1828513 | 9/2006 |
| CN | 101093459 | 12/2007 |
| CN | 101120305 | 2/2008 |
| CN | 101997918 | 3/2011 |
| EP | 1645960 | 5/2007 |
| JP | 2008529187 | 7/2008 |
| WO | 2006083327 | 8/2006 |
| WO | 2009009979 | 1/2009 |
| WO | 2011036015 | 3/2011 |
| WO | 2011036020 | 3/2011 |

OTHER PUBLICATIONS

IEEE Article, A Case for Continuous Data Protection at Block Level in Disk Array Storages, Weijun Xiao et al, first published Aug. 15, 2008, attached as IEEE_Trap_15Aug2008.pdf.*

NDMP—Network Data Management Protocol, R. Stager et al, published Oct. 1996, attached as NDMPProtocolSpecificationSummary1996.pdf.*

IBM Redbooks Paper, IBM System Storage FlashCopyManager and PPRC Manager Overview, Donald Chesarek et al, © 2008, attached as redp4065.pdf.*

(56) References Cited

OTHER PUBLICATIONS

Data Replication and Recover with Dell/EMC SnapView 2.0 and MirrorView, Richard Hou et al, Feb. 2003, attached as SnapView_DellWhitePaper_Feb2003.pdf.*
Symantec NetBackup Storage Migrator™ for UNIX, datasheet, © 2003 Veritas Software Corporation, attached as SymantecVeritasDataSheet2003.pdf.*
Veritas NetBackup Storage Migrator for UNIX v4.5, White Paper, © 2002 Veritas Software Corporation, attached as SymantecVeritasWhitePaper.pdf.*
Veritas NetBackup™ Storage Migrator Administrators Guide, © 1994-2007 Symantec Corporation, attached as Veritas Storage Migrator Administrator Guide.pdf.*
R. Hou, et a., "Data Replication and Recovery with Dell/EMC SnapView 2.0 and MirrorView", Dell Enterprise Systems, Feb. 2003, pp. 23 total.
W. Xiao, et al., "Case for Continuous Data Protection at Block Level in Disk Array Storages", IEEE Transactions on Parallel and Distributed Systems, vol. 20, No. 6, Jun. 2009, pp. 14 total.
PCT International Search Report dated Sep. 14, 2011 for Application No. PCT/EP2011/057950 filed May 17, 2011. pp. 12 total.
"Information Materials for IDS" dated Oct. 5, 2011 from Japanese Office Action dated Sep. 20, 2011 for Application No. 2011-533674 filed Oct. 20, 2009, pp. 2 total.
English Translation of CN1702627 published Nov. 30, 2005 by IBM Corp.
English Translation of CN1828513 published Sep. 6, 2006 by IBM Corp.
Chinese Office Action dated Nov. 29, 2012 for Serial No. 200980140528.6.
"Information Materials for IDS" dated Dec. 6, 2012 for Chinese Office Action dated Nov. 29, 2012.
U.S. Appl. No. 13/474,647, filed May 17, 2012, invented by John P. Agombar et al. pp. 18.
Preliminary Remarks, dated May 17, 2012, for U.S. Appl. No. 13/474,647, filed May 17, 2012, invented by John P. Agombar et al. pp. 2.
English abstract of Chinese patent No. CN1794199, published Jun. 28, 2006 by S. Agombar et al.
U.S. Appl. No. 13/039,245, filed Mar. 2, 2011 by inventors J.P. Agombar, et al., 22 pages.
U.S. Appl. No. 13/039,108, filed Mar. 2, 2011 by inventors J.P. Agombar, et al., 22 pages.
U.S. Appl. No. 13/069,293, filed Mar. 22, 2011 by inventors J.P. Agombar, et al., 24 pages.
U.S. Appl. No. 13/244,094, filed Sep. 23, 2011 by inventors C.B. Beeken, et al., 50 pages.
U.S. Appl. No. 13/251,867, filed Oct. 3, 2011 by inventors C.B. Beeken, et al., 32 pages.
International Search Report and Written Opinion, dated Feb. 28, 2013, for International Application No. PCT/IB2012/055016, filed Sep. 21, 2012, pp. 1-10.
English Abstract of EP1853992 dated Nov. 14, 2007.
English translation of CN101997918 dated Mar. 30, 2011.
B. Mason, "Deploying Oracle ASM with Oracle 10g RAC on AIX with IBM System Storage DS8000 and DS6000 Advanced Features", IBM Systems and Technology Group, Aug. 2007, San Jose California, 30 pgs. (Also at: http://www.filibeto.org/~aduritz/truetrue/oracle/aix/depl-oracle-asm-DS6_8000-adv.pdf.).
D. Rumney., "Visualizing IBM SAN Volume Controller FlashCopy Mappings", Jan. 22, 2009, 14 pgs. (Also at::http://www.danrumney.co.uk/papers/visualfcms/visualisefcms.pdf.).
"VCR and FTR", Feature Functions Overview, Mainstar Software Corporation, 2009, 6 pgs. (Also at: http://www.mainstar.com/pdf/vcr-ftr-features.pdf.).
Office Action dated Apr. 15, 2013, pp. 64, for U.S. Appl. No. 13/474,647, filed May 17, 2012 by inventors J.P. Agombar, et al.
Amend1 dated Jul. 15, 2013, pp. 12, to Office Action dated Apr. 15, 2013, pp. 64, for U.S. Appl. No. 13/474,647, filed May 17, 2012 by inventors J.P. Agombar, et al.
Notice Allowance dated Dec. 6, 2013 for U.S. Appl. No. 13/474,647, filed May, 17, 2012, 11 pp.

\* cited by examiner

POINT-IN-TIME COPIES IN A CASCADE USING MAPS AND FDISKS

BACKGROUND

This invention relates to a method of, and system for, handling a FlashCopy® process. (FlashCopy is a registered trademark of International Business Machines Corporation in the United States and other countries.) In one embodiment the method can be used for reversing a FlashCopy® mapping in a cascade.

A FlashCopy® process is a feature supported on various storage devices that allows a user or an automated process to make nearly instantaneous copies of entire logical volumes of data. A copy of a source disk is made on a target disk. The copies are immediately available for both read and write access. A common feature of FlashCopy® process like implementations is the ability to reverse the copy. That is, to populate the source disk of a FlashCopy® map with the contents of the target disk. With cascaded implementations, in which a target disk later becomes the source disk for a further FlashCopy® process, this feature is complicated by the fact that the "grains" of data presented by a disk are located on a number of target/source disks "upstream" of the disk itself. This means that in order for a disk to maintain the image it is presenting, it must have access to all the disks containing these grains of data.

Reversing a FlashCopy® process is the process of ensuring that the source disk presents the same image as the target disk, at the point in time that the reverse is started. This means that the contents of the source disk need to be modified in order to maintain the correct image. Now, if all of the target disks between the source and target disks in the cascade and the target disk itself are not needed, then the reverse can be achieved by simply taking offline all the target disks and reversing the order of the source and target disks in the cascade. Although this solution is sufficient for some use cases, it drastically restricts the flexibility of the FlashCopy® implementation, because in most cases the user will be reluctant to accept the loss of their intermediate FlashCopy® images, since they may contain other valid backup copies of the original source.

It is therefore an object of the invention to improve upon the known art.

SUMMARY

According to a first aspect of the present invention, there is provided a method of handling a FlashCopy® process comprising receiving a FlashCopy® instruction for a source disk, performing a FlashCopy® point in time copy of the source disk on to a target disk, creating a map specifying the FlashCopy® point in time copy from the source disk to the target disk, creating a primary fdisk for the source disk, if one does not already exist, and creating a primary fdisk for the target disk, if one does not already exist, or, if one does already exist, converting the existing primary fdisk for the target disk into a secondary fdisk, and creating a new primary fdisk for the target disk.

According to a second aspect of the present invention, there is provided a system for handling a FlashCopy® process comprising a user interface arranged to receive a FlashCopy® instruction for a source disk, and a processor arranged to perform a FlashCopy® point in time copy of the source disk on to a target disk, to create a map specifying the FlashCopy® point in time copy from the source disk to the target disk, to create a primary fdisk for the source disk, if one does not already exist, and to create a primary fdisk for the target disk, if one does not already exist, or, if one does already exist, to convert the existing primary fdisk for the target disk into a secondary fdisk, and to create a new primary fdisk for the target disk.

According to a third aspect of the present invention, there is provided a computer program product on a computer readable medium for handling a FlashCopy® process, the product comprising instructions for receiving a FlashCopy® instruction for a source disk, performing a FlashCopy® point in time copy of the source disk on to a target disk, creating a map specifying the FlashCopy® point in time copy from the source disk to the target disk, creating a primary fdisk for the source disk, if one does not already exist, and creating a primary fdisk for the target disk, if one does not already exist, or, if one does already exist, converting the existing primary fdisk for the target disk into a secondary fdisk, and creating a new primary fdisk for the target disk.

Owing to the invention, it is possible to provide a data structure that will support the use of cascaded FlashCopy® processes using multiple source and target disks that will support reversal of any FlashCopy® process back to a source disk, without losing any of the FlashCopy® images that are represented within the cascade. Standard IO commands can still be applied to any of the source or target disks, and the nature of the data structure that has been created supports a simple handling of the IO commands, which lead to the FlashCopy® processes being correctly processed through the cascade.

The proposed solution is to allow a disk to exist a number of times in the same cascade or in separate cascades. In order to reverse a FlashCopy® map a user can simply create and start a map in the opposite direction. For example, a map from VDisk1 to VDisk2 can be reversed by creating a new map from VDisk2 to VDisk1. The present invention describes a scheme that allows both maps to be active simultaneously. This means that the image presented by VDisk2 can be maintained at the same time as VDisk1 is recovered.

This scheme introduces the concept of an fdisk, which is internal to the FlashCopy® process, and is used to represent the source or target disk for a given FlashCopy® map in the cascade. The FlashCopy® cascades are constructed between maps and fdisks. The scheme enables a map to be reversed by allowing a VDisk to be represented in multiple cascades or in multiple points in the same cascade by different fdisks. One fdisk will represent the VDisk that is being presented to the host and the other fdisks will represent the VDisk required to maintain the cascade at other points. An fdisk, in one embodiment, is an aspect of a VDisk. In this implementation, the fdisk could, for example, be an object (structure) which links the VDisk to the maps upstream and downstream of the position within the cascade.

Preferably, the method further comprising receiving an IO command for a specific disk, and processing the IO command according to a predefined set of rules relating to the existence of primary and secondary fdisks for the specific disk. In one embodiment, the predefined set of rules define cleaning of a secondary fdisk prior to processing the IO command, the cleaning comprising copying data from the specific disk to the target disk defined in the map linked to the secondary disk. The data structure can be used to maintain the correct structures in the cascade, when IO commands are received by disks, wherever they are in the cascade. The rules define the handling of the IO instructions.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
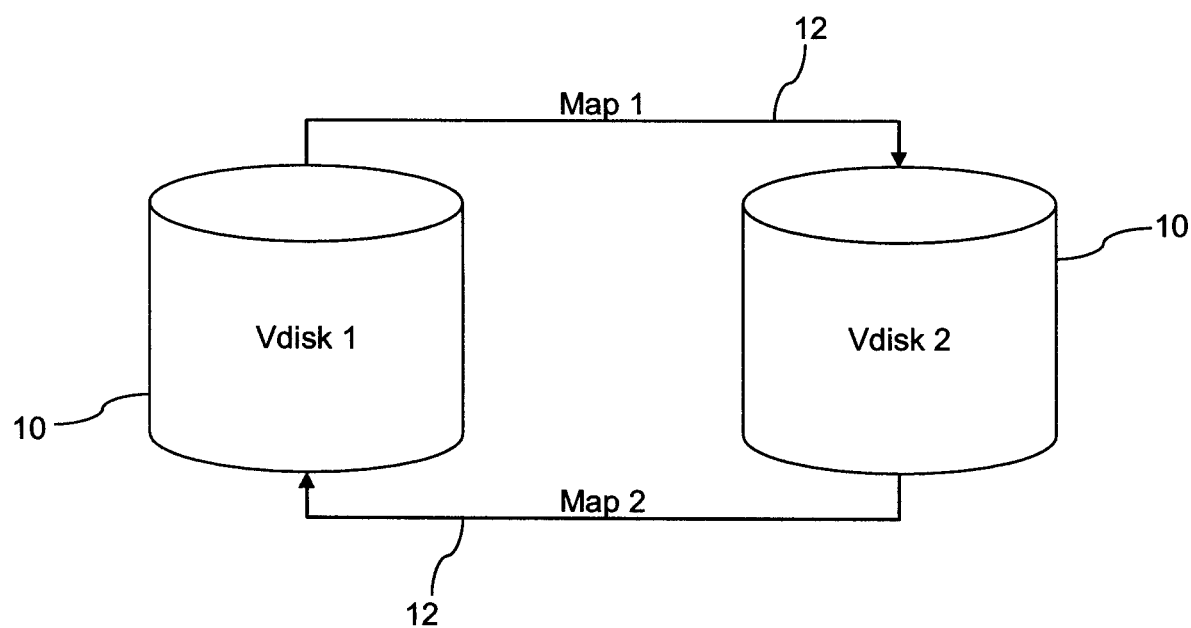
FIG. 1 is a schematic diagram of a pair of storage disks.

FIG. 1 illustrates the concept of a FlashCopy® process using two disks 10. The disks 10 could form part of a larger array of disks, and would typically form part of an enterprise storage solution. The disks 10 could be part of a storage solution relating to a commercial website, for example. If at any time a backup needs to be made of the content of Vdisk1, then a FlashCopy® instruction can be sent to that disk, which defines a source disk (Vdisk1) and also a target disk, which is the target of the FlashCopy® instruction. The FlashCopy® instruction creates a point in time copy of the image of the disk which is the source disk.

In the example of FIG. 1, the source disk of a first FlashCopy® instruction is Vdisk1, and the target disk is Vdisk2. The FlashCopy® instruction starts the FlashCopy® process, which creates a map 12 from the source disk 10 to the target disk 10. This first map is labelled map 1 in the Figure. The image of Vdisk1 at this specific point in time is now available on Vdisk2. This creates a backup of the data on Vdisk1, and also allows tests and other administration tasks to be run on the data of Vdisk1, without the attendant danger of losing any of the original data, as it is preserved on the original source disk.

When a FlashCopy® point in time copy is made, it creates a link between the two disks 10, as defined by the map 12. Data may now be copied across in the background, with the additional requirement that any access to Vdisk2 (as the target disk 10) will immediately cause the relevant parts of the image of Vdisk1 to be copied across, and also any access to Vdisk1 which would result in a change to the image stored by that disk 10 will also cause the unaltered data to be immediately copied across. In this way, the Vdisk2, to an outside user, stores the point in time copy of Vdisk1, although data will only be physically copied across under the circumstances described above.

In order to reverse a FlashCopy® map, the user or administrator can simply create and start a map 12 in the opposite direction. The user issues a FlashCopy® instruction that specifies a map from a new source to target disk. For example, the map 12 from VDisk1 to VDisk2 can be reversed by creating a new map (map 2) from VDisk2 to VDisk1. The system of the present invention, described in more detail below, describes a scheme that allows both maps 12 to be active simultaneously. This means that the image presented by VDisk2 can be maintained at the same time as VDisk1 is recovered. This is valuable in relation to, for example, Flash-Copy® cascades.

Figure 2:
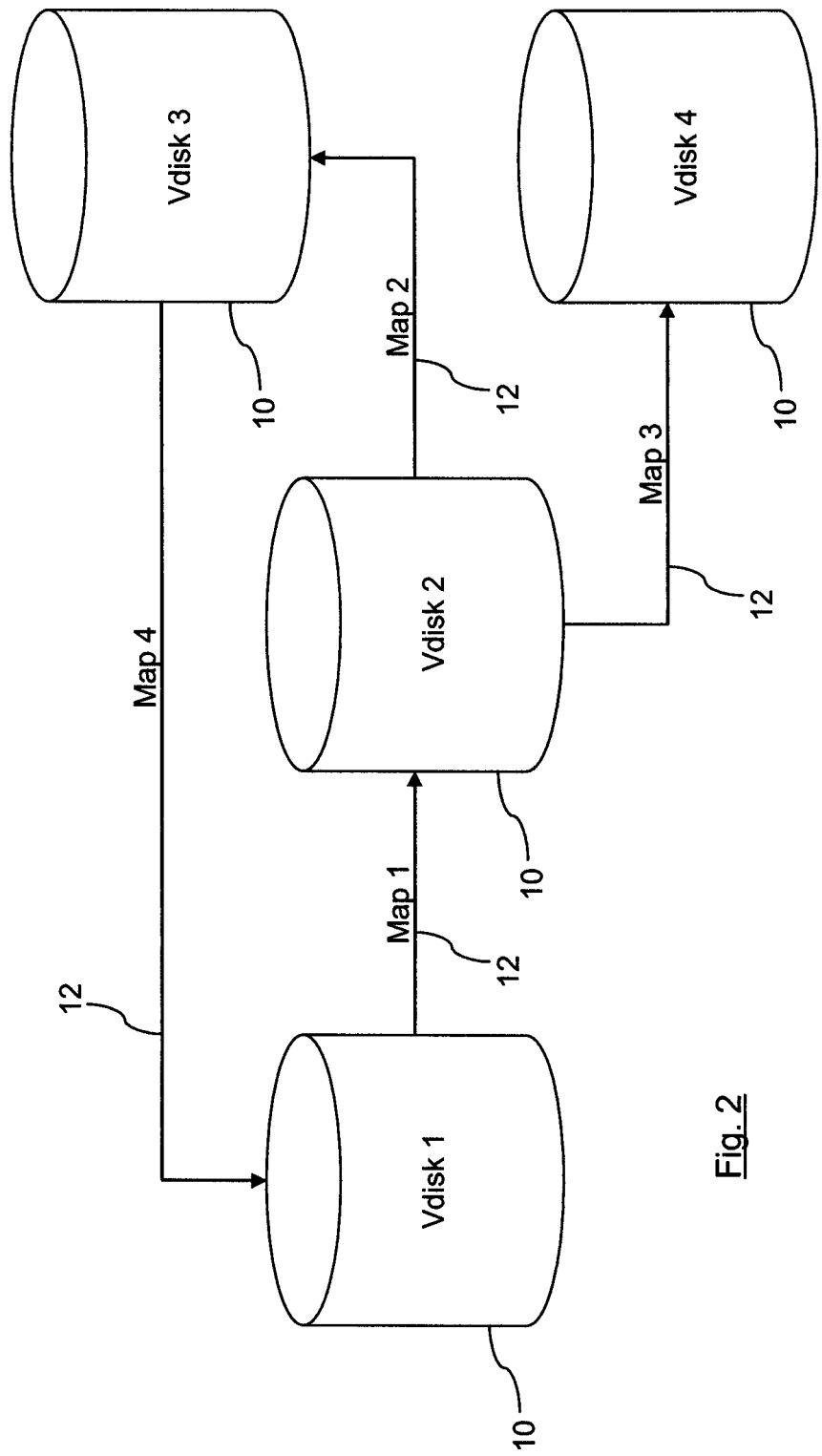
FIG. 2 is a schematic diagram of a cascade of storage disks.

FIG. 2 illustrates a FlashCopy® cascade, which exists in relation to four disks 10 that form part of an enterprise storage solution. Each map 12 within the Figure represents a FlashCopy® instruction that has resulted in a point in time copy of a Vdisk 10 being taken and passed from a source disk 10 to a target disk 10. A user has at various times requested that a disk 10 that has been the target for an earlier FlashCopy® point in time copy, should become the source for a later FlashCopy® point in time copy, in a process that creates a cascade of FlashCopy® point in time copies. Actions can be taken in respect of an image on a Vdisk 10 after a FlashCopy® point in time copy has been made.

The system allows a disk 10 to exist a number of times in the same cascade or in separate cascades. The scheme of the invention will extend to more complex graphs of trees for example. In this example, before map 4 is started, VDisk1 contains the users original set of data and VDisk2 contains a backup of that data. VDisk3 and VDisk4 contain further snapshots of the data on which two different simulations have been run. The user then decides that they like the result of the simulation on VDisk3 and want to restore this data back onto VDisk1. The scheme allows the user to start map 4 and copy the modified image from VDisk3 to Vdisk1 whilst still maintaining the unmodified backup of the original data on VDisk2.

This scheme operated by a system according to the invention, introduces the concept of an fdisk, which is a data structure internal to the FlashCopy® process, and is used to represent the source or target disk 10 for a given FlashCopy® map in the cascade. The FlashCopy® cascades are then constructed between maps 12 and fdisks. The scheme enables a map 12 to be reversed by allowing a VDisk 10 to be represented in multiple cascades or in multiple points in the same cascade by different fdisks. A first fdisk will represent the VDisk that is being presented to the host and the other fdisks will represent the VDisk required to maintain the cascade at other points.

Figure 3:
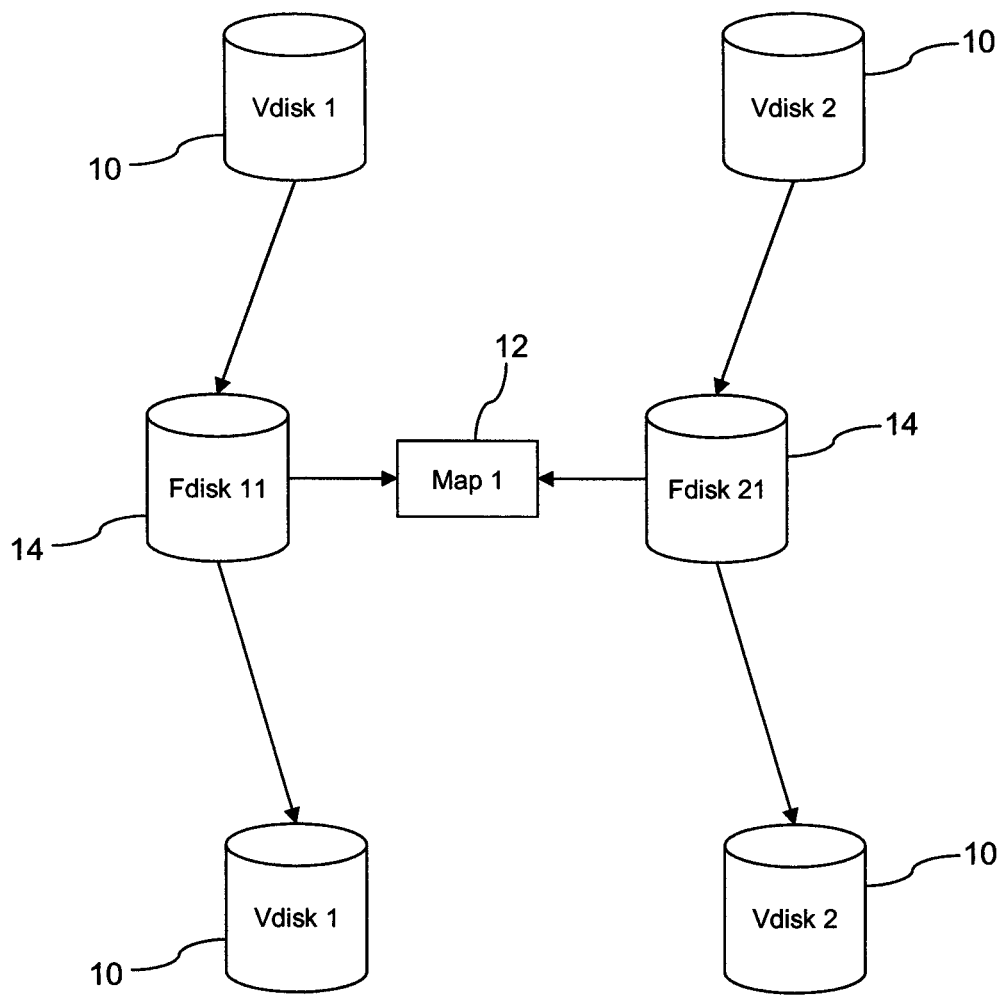
FIG. 3 is a schematic diagram of a data structure created following a FlashCopy® process.

FIG. 3 illustrates the data structure created by the system, in relation to the disks of FIG. 1, after map1 has been formed. The fdisks 14 are created, whenever there is a FlashCopy® instruction. The fdisk 14 is a logical structure, rather than the physical structure of the source and target disks 10. In the first example above, there is a map Map 1 from VDisk1 to VDisk2. When this map 12 is started, the VDisk and fdisk are arranged so that IO (input/output) commands directed to VDisk1 are redirected to FDisk11 and IO commands to VDisk2 are redirected to FDisk21. The fdisks 14 will process IO commands according to the usual cascaded algorithm. IO from the fdisk is then redirected to the appropriate VDisk below.

In the simple structure of FIG. 1, after the FlashCopy® instruction, which creates the first map 1, the creation of the fdisks 14 is a basis for dealing with more complicated cascading FlashCopy® processes. Each fdisk 14 that is created can be either a primary fdisk 14 or a secondary fdisk 14. The scheme that is used in relation to the creation of the fdisks 14 for the disks 10 is that there is created a primary fdisk 14 for the source disk 10, if one does not already exist. Additionally, there is created a primary fdisk 14 for the target disk 10, if one does not already exist, or, if one does already exist, the existing primary fdisk 14 for the target disk 10 is converted into a secondary fdisk 14, and a new primary fdisk 14 is created for the target disk 10. This data structure supports the handling of the cascading FlashCopy® processes.

For example, in FIG. 1, after the creation of the FlashCopy® backup with map 1, the user reversed the process with the FlashCopy® backup which is embodied in map 2. The data structure of FIG. 3 would be amended after this action, to look like the data structure of FIG. 4. In order to reverse VDisk2 onto VDisk1 the user creates map 2 from VDisk2 to VDisk1. When map 2 is started, a new primary fdisk 14 is created for VDisk1 and the current primary fdisk 14 is demoted to a secondary role. This is shown in the Figure, where new FDisk12 14 has been created, which is linked to VDisk1, and the pre-existing FDisk11 is changed to a secondary fdisk.

When future IO commands are directed to VDisk1, then firstly the secondary fdisk data must be "cleaned" and then the IO command is directed to FDisk12 as normal. Cleaning of an fdisk involves copying the existing data from that source disk onto the target disk of the first dependent map in the cascade. In this example, this would involve copying the data from Vdisk1 to Vdisk2. In this way the image presented by VDisk2 can be maintained. All future IO commands are handled according to a predefined set of rules, which relate to the existence of primary and secondary fdisks for the specific disk to which the specific IO command relates.

Figure 4:
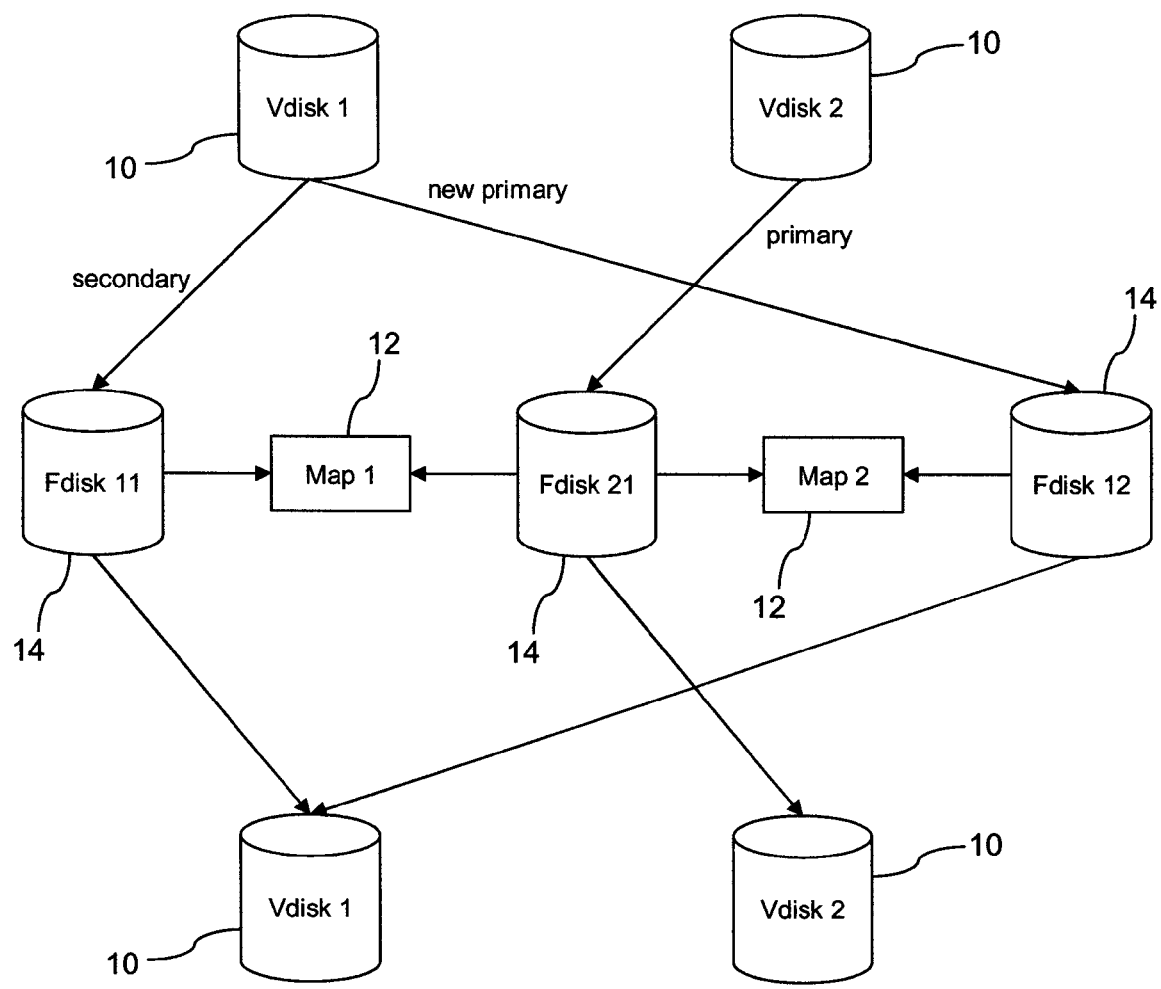
FIG. 4 is a schematic diagram of a further data structure.

In the structure of FIG. 4 the fdisks could be objects defined by:

FDisk 11:
Vdisk Index: 1;
Up Map: NULL;
Dn Map: Map1
FDisk 12:
Vdisk Index: 1;
Up Map: Map 2
Dn Map: NULL
FDisk 21:
Vdisk Index: 2;
Up Map: Map 1
Dn Map: Map 2

Each fdisk has an index defining the Vdisk to which it relates, and has links to the relevant maps that define the up and down directions of the original FlashCopy® point in time copies in the cascade.

In general, each VDisk has a primary fdisk and may have secondary fdisks. A VDisk can be in one of four states governed by its primary and secondary fdisks. These states are no primary, no secondary; active primary, no secondary; active primary, active secondary; and no primary, active secondary. If there is no primary and no secondary then this implies that no FlashCopy® cascade is interested in the specific VDisk and so all IO will be passthrough. If there is an active primary, but no secondary, then this implies that the IO commands for this VDisk should be passed on to the primary fdisk for processing. There is no pre-IO cleaning to be carried out. If there is an active primary and an active secondary then this implies that the IO for this VDisk should be passed on to the primary fdisk for processing. Prior to any processing of the IO, the secondary should first be cleaned. Finally, if there is no primary, but an active secondary, then before processing the IO, the secondary should first be cleaned. Once the secondary is cleaned the IO is passthrough.

The above has been described to include the state of "no primary, active secondary". Whether a VDisk can actually exist without a primary is dependent on the implementation. For instance, an implementation may allow the user to prematurely stop a map. This would destroy the Target fdisk, which may be a primary. At this point, the implementation could promote the secondary to a primary, or it could leave the Vdisk with no primary. It is for the implementers to decide which approach makes the most sense, but both would work.

Figure 5:
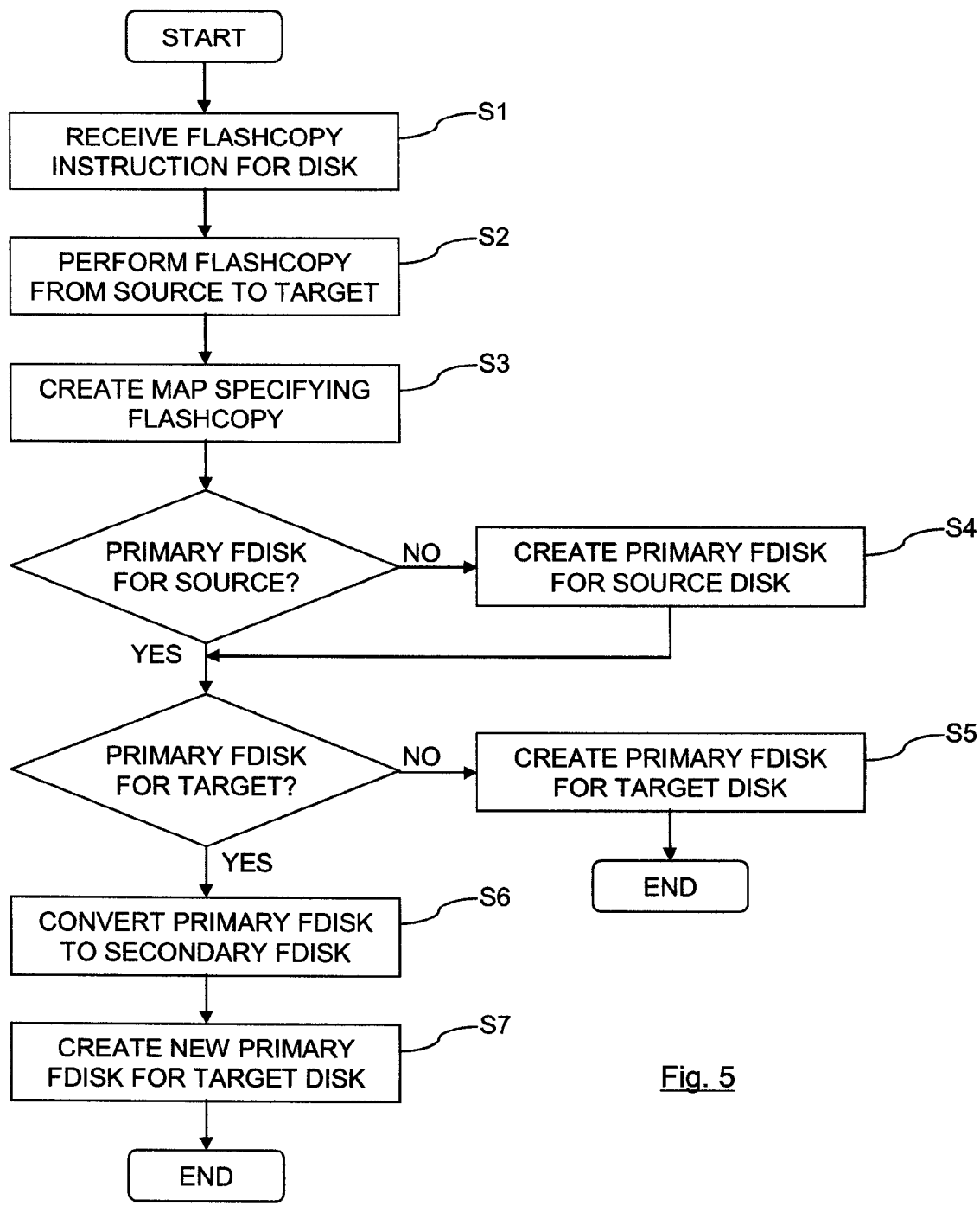
FIG. 5 is a flowchart of a method of handling a FlashCopy® process.

The method of handling the FlashCopy® process to create the data structure is summarised in FIG. 5. The method comprises, firstly, step S1, which is the step of receiving a Flash-Copy® instruction for a source disk. This may be received from an administrator through a suitable user interface. The remainder of the method is carried out by a processing function that is part of, or attached to, the enterprise storage system that comprises the various disks.

The first step S1 is followed by step S2, in which there is performed the FlashCopy® point in time copy of the source disk on to a target disk. The next step is step S3, which comprises creating a map specifying the FlashCopy® point in time copy from the source disk to the target disk. In this way a FlashCopy® point in time copy is carried out and a map is created that contains the detail of the specific FlashCopy® point in time copy. Note that the FlashCopy® point in time copy could be a reversal of an earlier FlashCopy® point in time copy, but both actions are considered to be FlashCopy® point in time copies in the sense of copying data from a source disk to a target disk.

There is next carried out a step to check is there exists a primary fdisk for the source disk. If not, then method proceeds to step S4, which comprises creating a primary fdisk for the source disk, as one does not already exist. Note that if an fdisk already exists for the source disk, there is no need to take any action in respect of that source disk, and the method simply moves to the next check.

Once the creation of an fdisk has been completed for the source disk, if one was needed, then the next stage is to check whether a primary fdisk exists for the target disk. If the answer is no, then at step S5, there is created a primary fdisk for the target disk, as one does not already exist. If one does already exist, then the method proceeds to step S6, which comprises converting the existing primary fdisk for the target disk into a secondary fdisk. The final step of the method is the step S7 of creating a new primary fdisk for the target disk.

In this way, the data structure of fdisks and maps is created each time a FlashCopy® point in time copy is made of any source disk. Preferably the step S3 of the method also comprises linking the created map to each created primary fdisk. This ensures that a data structure is present that will support the cascading of FlashCopy® point in time copies through disks that nevertheless provides sufficient flexibility to obtain the data at different places within the cascade, without requiring the need for any complicated administrator intervention.

The scheme will also allow for any number of secondary fdisks. The number of fdisks associated with a disk determines the rules for which maps can be started simultaneously. A balance between flexibility and performance needs to be set because of the extra workload due to the cleaning IO redirected to the secondaries that must be completed before the primary IO can proceed.

As discussed above, once an IO command has been received for a specific disk, then the processing of the IO command is according to a predefined set of rules relating to the existence of primary and secondary fdisks for the specific disk. Advantageously, the predefined set of rules define cleaning of a secondary fdisk prior to processing the IO command, the cleaning comprising copying data from the specific disk to the target disk defined in the map linked to the secondary disk.

The invention claimed is:

1. A system for handling a copy process comprising:
a processor arranged to:
for a point in time copy from a source disk to a target disk that are part of a cascade of disks, wherein the cascade represents a series of point in time copies between the disks, create a map specifying the point in time copy from the source disk to the target disk;
in response to determining that a primary fdisk does not exist for the source disk, create the primary fdisk for the source disk, wherein the primary fdisk for the source disk comprises an object that links the source disk to maps upstream and downstream within a cascade;

in response to determining that a primary fdisk does not exist for the target disk, create the primary fdisk for the target disk, wherein the primary fdisk for the target disk comprises an object that links the target disk to maps upstream and downstream within the cascade; and in response to determining that the primary fdisk for the target disk does exist,
convert the existing primary fdisk for the target disk into a secondary fdisk; and
create a new primary fdisk for the target disk.

2. The system according to claim 1, wherein the processor is further arranged to:
link the created map to the primary fdisk for the source disk and the primary fdisk for the target disk in the cascade.

3. The system according to claim 2, wherein the processor is further arranged to:
receive an IO command for a specific disk; and
process the IO command according to a predefined set of rules relating to the existence of primary and secondary fdisks for the specific disk.

4. The system according to claim 3, wherein the predefined set of rules define cleaning of a secondary fdisk prior to processing the IO command, and wherein the processor is further arranged to:
copy data from the specific disk to a target disk defined in a map linked to a secondary disk.

5. The system according to claim 1, wherein at least one target disk among the disks from an earlier point in time copy becomes a source disk for a new point in time copy.

6. The system according to claim 1, wherein a source disk is represented in multiple cascades with different fdisks.

7. The system according to claim 1, wherein a source disk is represented at different positions within a cascade with different fdisks.

8. A computer program product on a non-transitory computer readable medium for handling a copy process, the product comprising instructions for:
for a point in time copy from a source disk to a target disk that are part of a cascade of disks, wherein the cascade represents a series of point in time copies between the disks, creating a map specifying the point in time copy from the source disk to the target disk;

in response to determining that a primary fdisk does not exist for the source disk, creating the primary fdisk for the source disk, wherein the primary fdisk for the source disk comprises an object that links the source disk to maps upstream and downstream within a cascade;

in response to determining that a primary fdisk does not exist for the target disk, creating the primary fdisk for the target disk, wherein the primary fdisk for the target disk comprises an object that links the target disk to maps upstream and downstream within the cascade; and in response to determining that the primary fdisk for the target disk does exist,
converting the existing primary fdisk for the target disk into a secondary fdisk; and
creating a new primary fdisk for the target disk.

9. The computer program product of claim 8, wherein the instructions further comprise:
linking the created map to the primary fdisk for the source disk and the primary fdisk for the target disk in the cascade.

10. The computer program product of claim 9, wherein the instructions further comprise:
receiving an IO command for a specific disk; and
processing the IO command according to a predefined set of rules relating to the existence of primary and secondary fdisks for the specific disk.

11. The computer program product of claim 10, wherein the predefined set of rules define cleaning of a secondary fdisk prior to processing the IO command, and wherein the instructions further comprise:
copying data from the specific disk to a target disk defined in a map linked to a secondary disk.

12. The computer program product of claim 8, wherein at least one target disk among the disks from an earlier point in time copy becomes a source disk for a new point in time copy.

13. The computer program product of claim 8, wherein a source disk is represented in multiple cascades with different fdisks.

14. The computer program product of claim 8, wherein a source disk is represented at different positions within a cascade with different fdisks.

* * * * *